(12) United States Patent
Wang et al.

(10) Patent No.: US 11,212,248 B2
(45) Date of Patent: Dec. 28, 2021

(54) METHOD AND DEVICE FOR MANAGING A USER

(71) Applicant: SHANGHAI ZHANGMEN SCIENCE AND TECHNOLOGY CO., LTD., Shanghai (CN)

(72) Inventors: Fei Wang, Shanghai (CN); Xiaolin Tong, Shanghai (CN)

(73) Assignee: SHANGHAI ZHANGMEN SCIENCE AND TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 16/853,729

(22) Filed: Apr. 20, 2020

(65) Prior Publication Data

US 2020/0252363 A1    Aug. 6, 2020

Related U.S. Application Data

(63) Continuation of application No. PCT/CN2018/110373, filed on Oct. 16, 2018.

(30) Foreign Application Priority Data

Oct. 18, 2017  (CN) .......................... 201710971551.6

(51) Int. Cl.
*G06F 15/16* (2006.01)
*H04L 12/58* (2006.01)
(Continued)

(52) U.S. Cl.
CPC ............ *H04L 51/32* (2013.01); *G06Q 50/01* (2013.01); *H04L 51/046* (2013.01); *H04L 67/306* (2013.01)

(58) Field of Classification Search
CPC ..... H04L 51/32; H04L 51/046; H04L 67/306; G06Q 50/01
(Continued)

(56) References Cited

U.S. PATENT DOCUMENTS 8,595,806 B1 * 11/2013 Gabrielson ............. H04L 63/18
726/7
8,694,585 B2 * 4/2014 Turner ..................... H04L 67/38
709/204
(Continued)

FOREIGN PATENT DOCUMENTS

CN          1929423 A      3/2007
CN        102546702 A      7/2012
(Continued)

*Primary Examiner* — Anthony Mejia
(74) *Attorney, Agent, or Firm* — Bayramoglu Law Offices LLC

(57) ABSTRACT

A method for managing a user includes: sending, to a second network device, first equipment identification information of a first user equipment corresponding to a first user account; receiving connection record information corresponding to the first user equipment returned by the second network device; and determining, based on the connection record information, one or more second user accounts corresponding to the first user account, where there is at least one same visited wireless access point between a second user equipment corresponding to each of the second user accounts and the first user equipment. According to the present application, a social account is recommended in a social server based on the same wireless access point according to a connection record in a hotspot server.

13 Claims, 3 Drawing Sheets

(51) Int. Cl.
*G06Q 50/00* (2012.01)
*H04L 29/08* (2006.01)

(58) Field of Classification Search
USPC .......................................................... 709/204
See application file for complete search history.

(56) References Cited

U.S. PATENT DOCUMENTS

| | | | | |
|---|---|---|---|---|
| 8,737,957 | B2* | 5/2014 | Raleigh | G06Q 20/20 |
| | | | | 455/407 |
| 10,038,729 | B1* | 7/2018 | Ramalingam | H04W 48/12 |
| 2006/0265507 | A1* | 11/2006 | Banga | H04L 67/20 |
| | | | | 709/228 |
| 2006/0271690 | A1* | 11/2006 | Banga | H04L 67/306 |
| | | | | 709/228 |
| 2009/0112871 | A1* | 4/2009 | Hawthorne | H04L 67/306 |
| 2009/0112982 | A1* | 4/2009 | Kuhlmann | H04L 12/66 |
| | | | | 709/204 |
| 2012/0151047 | A1* | 6/2012 | Hodges | G06Q 50/01 |
| | | | | 709/224 |
| 2013/0198383 | A1* | 8/2013 | Tseng | H04L 63/102 |
| | | | | 709/225 |
| 2014/0095595 | A1* | 4/2014 | Matlija | H04L 63/08 |
| | | | | 709/204 |
| 2015/0072653 | A1* | 3/2015 | Fan | H04L 12/2807 |
| | | | | 455/411 |
| 2015/0373547 | A1* | 12/2015 | Huber | H04W 48/04 |
| | | | | 455/411 |
| 2016/0156635 | A1* | 6/2016 | Liu | H04W 4/029 |
| | | | | 726/4 |
| 2016/0241665 | A1* | 8/2016 | Covell | H04L 67/10 |
| 2016/0295384 | A1* | 10/2016 | Shan | H04L 51/20 |
| 2017/0295479 | A1* | 10/2017 | Artuso | H04W 4/02 |
| 2018/0077741 | A1* | 3/2018 | Pan | H04W 4/80 |
| 2018/0314961 | A1* | 11/2018 | Scapa | H04W 4/02 |
| 2020/0133985 | A1* | 4/2020 | Xiao | G06Q 10/10 |

FOREIGN PATENT DOCUMENTS

| | | |
|---|---|---|
| CN | 107135149 A | 9/2017 |
| CN | 107835498 A | 3/2018 |
| WO | 2013170566 A1 | 11/2013 |

* cited by examiner

METHOD AND DEVICE FOR MANAGING A USER

CROSS REFERENCE TO THE RELATED APPLICATIONS

This application is the continuation application of International Application No. PCT/CN2018/110373, filed on Oct. 16, 2018, which is based upon and claims priority to Chinese Patent Application No. 201710971551.6, filed on Oct. 18, 2017, the entire contents of which are incorporated herein by reference.

TECHNICAL FIELD

The present application relates to the field of communications, and in particular, to a technology for managing a user.

BACKGROUND

With the popularity of wireless networks and mobile devices in daily life, increasingly more people are keen to make online friends through a social platform. However, online friends lack face-to-face communication, and an impetuous atmosphere in the network makes integrity unable to be guaranteed for communication between persons. In addition, friends who communicate in the social platform are generally regarded as virtual objects, and it is difficult to meet requirements of users who develop offline dating.

SUMMARY

An objective of the present application is to provide a method and device for managing a user.

According to one aspect of the present application, a method for managing a user at a first network device side is provided, the method including:

sending first equipment identification information of a first user equipment corresponding to a first user account to a second network device;

receiving connection record information corresponding to the first user equipment returned by the second network device; and determining, based on the connection record information, one or more second user accounts corresponding to the first user account, where there is at least one same visited wireless access point between a second user equipment corresponding to each of the one or more second user accounts and the first user equipment.

According to another aspect of the present application, a method for managing a user at a second network device side is provided, the method including:

receiving first equipment identification information of a first user equipment corresponding to a first user account from a first network device;

determining, according to the first equipment identification information, connection record information corresponding to the first user equipment; and sending the connection record information to the first network device.

According to one aspect of the present application, a device for managing a user is provided, the device including:

a processor; and a memory configured to store computer executable instructions that, when executed, cause the processor to:

send first equipment identification information of a first user equipment corresponding to a first user account to a second network device;

receive connection record information corresponding to the first user equipment returned by the second network device; and determine, based on the connection record information, one or more second user accounts corresponding to the first user account, where there is at least one same visited wireless access point between a second user equipment corresponding to each of the one or more second user accounts and the first user equipment.

According to another aspect of the present application, a device for managing a user is provided, the device including:

a processor; and a memory configured to store computer executable instructions that, when executed, cause the processor to:

receive first equipment identification information of a first user equipment corresponding to a first user account from a first network device;

determine, according to the first equipment identification information, connection record information corresponding to the first user equipment; and send the connection record information to the first network device.

According to one aspect of the present application, a computer readable medium including instructions is provided, which cause, when executed, a system to perform the following operations:

sending first equipment identification information of a first user equipment corresponding to a first user account to a second network device;

receiving connection record information corresponding to the first user equipment returned by the second network device; and determining, based on the connection record information, one or more second user accounts corresponding to the first user account, where there is at least one same visited wireless access point between a second user equipment corresponding to each of the one or more second user accounts and the first user equipment.

According to another aspect of the present application, a computer readable medium including instructions is provided, which cause, when executed, a system to perform the following operations:

receiving first equipment identification information of a first user equipment corresponding to a first user account from a first network device;

determining, according to the first equipment identification information, connection record information corresponding to the first user equipment; and sending the connection record information to the first network device.

In comparison to the prior art, according to the present application, a social account is recommended in a social server based on the same wireless access point according to a connection record in a hotspot server, which not only helps a social user expand his/her social network, but also makes it easy to make friends offline because the social user and the recommended social user have previously connected to the same wireless access point and are close to each other in physical distance, thereby improving the social networking experience of the user.

BRIEF DESCRIPTION OF THE DRAWINGS

Other features, objectives, and advantages of the present application will become more obvious by reading the detailed description of non-limiting embodiments that is provided with reference to the following accompanying drawings.

The same or similar reference numerals in the drawings represent the same or similar components.

DETAILED DESCRIPTION

Figure 1:
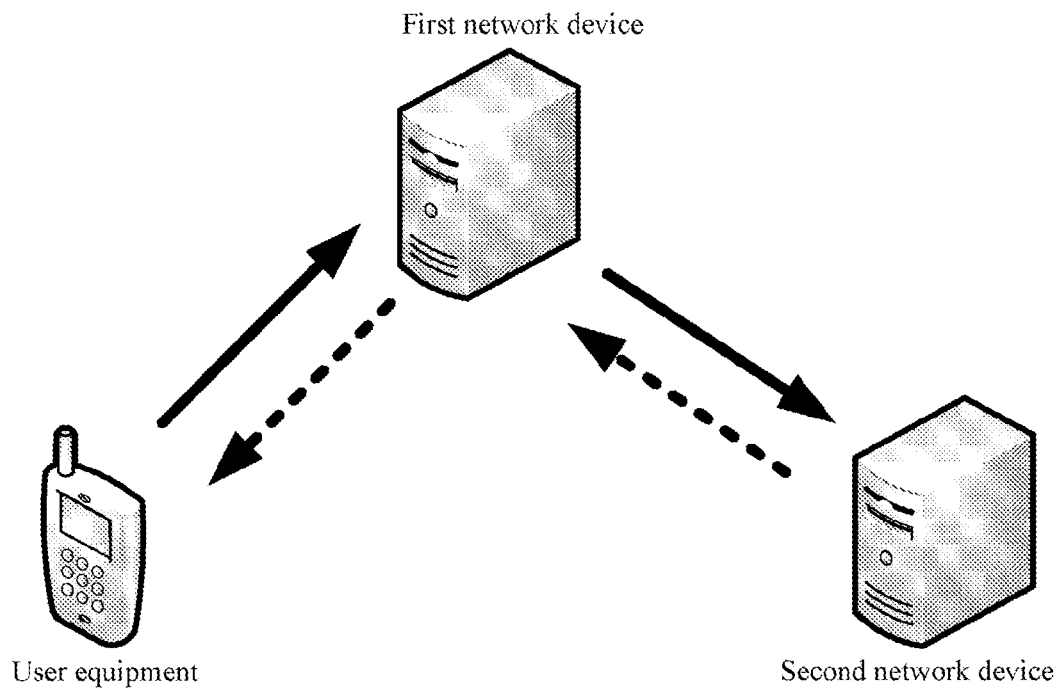
FIG. 1 is a topology diagram of a system for managing a user according to an embodiment of the present application.

The following further describes the present application in detail with reference to accompanying drawings in this specification.

In a typical configuration, a terminal, a device of a service network, and a trustee all include one or more processors (CPUs), an input/output interface, a network interface, and a memory.

The memory may include, among computer-readable media, a non-persistent memory such as a random access memory (RAM) and/or a non-volatile memory such as a read-only memory (ROM) or a flash memory (flash RAM). The memory is an example of the computer-readable medium.

The computer-readable medium includes persistent, non-persistent, movable, and unmovable media that may implement information storage by using any method or technology. Information may be a computer-readable instruction, a data structure, a program module, or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage devices or any other non-transmission media that may be configured to store information that a computing device can access.

The devices in the present application include, but are not limited to user equipment, a network device, or a device formed by integrating the user equipment and the network device through a network. The user equipment includes, but is not limited to, any mobile electronic product that can perform human-computer interaction with a user, such as a smart phone, a tablet computer, and the like, and the mobile electronic product can adopt any operating system, such as an android operating system, an iOS operating system. The network device includes an electronic device capable of automatically performing numerical calculation and information processing according to an instruction set or stored in advance, and hardware of the network device includes but is not limited to a microprocessor, an application-specific integrated circuit (ASIC), a programmable logic device (PLD), a field programmable gate array (FPGA), a digital signal processor (DSP), an embedded device, and the like. The network device includes, but is not limited to, a computer, a network host, a single network server, a plurality of network server sets, or a cloud composed of a plurality of servers. In this case, the cloud is composed of a large quantity of computers or network servers based on cloud computing. Cloud computing is a type of distributed computing, and is a virtual supercomputer composed of a group of loosely coupled computer sets. The network includes, but is not limited to, the Internet, a wide area network, a metropolitan area network, a local area network, a VPN network, a wireless ad hoc network (AdHoc network), and the like. Preferably, the devices may also be a program run on the user equipment, the network device, or the user equipment and the network device, the network device, a touch terminal, or a device formed by integrating the network device and the touch terminal through a network.

Certainly, a person skilled in the art should understand that the devices above are only examples, and other existing or future devices, if applicable to the present application, shall also be included in the protection scope of the present application and hereby incorporated by reference.

In the descriptions of the present application, the meaning of "a plurality of" is two or more, unless otherwise explicitly and specifically defined.

FIG. 1 shows a typical scenario that a first network device recommends a second user account to a first user according to the present application. The first network device completes the process of determining the second user account through cooperation with a second network device, and then the first network device sends the second user account to a first user equipment. The first network device herein is a social server, and both a first user account and the second user account are application accounts in the social server. The second network device is a hotspot server, and records access point identification information of a wireless access point visited by each user equipment.

Figure 2:
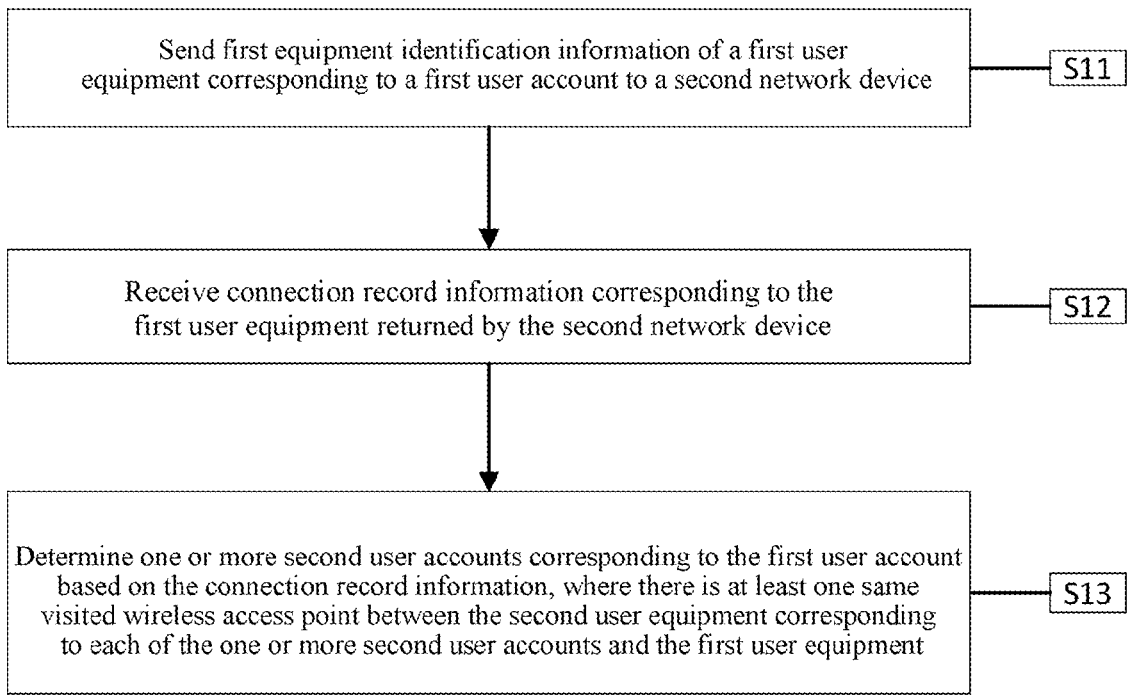
FIG. 2 is a flowchart of a method for managing a user at a first network device side according to an embodiment of the present application.

FIG. 2 shows a method for managing a user at a first network device side according to some embodiments of the present application. The method includes step S11, step S12, and step S13. In step S11, a first network device sends first equipment identification information of a first user equipment corresponding to a first user account to a second network device. In step S12, the first network device receives connection record information corresponding to the first user equipment returned by the second network device. In step S13, the first network device determines, based on the connection record information, one or more second user accounts corresponding to the first user account, where there is at least one same visited wireless access point between a second user equipment corresponding to each of the one or more second user accounts and the first user equipment. Equipment identification information is information that can uniquely identify a mobile phone, such as a bound mobile phone number and MAC address information. A MAC address is used as an example in the embodiment. For access point identification information of the wireless access point, the MAC address information is used as an example.

For example, a first user holds a first user equipment (such as a mobile phone), the first user equipment is installed with an application corresponding to the social server, and the first user has a corresponding first user account in the application. The social server sends, to a hotspot server, the MAC address information corresponding to the first user equipment, and the hotspot server queries, according to the first equipment identification information, an access log corresponding to the first equipment identification information, to obtain MAC address information of one or more hotspots connected to the first user equipment. The hotspot server may send the MAC address information of the one or more hotspots to the social server as connection record information, and the social server receives the MAC address information of the one or more hotspots, and determines, by performing matching, second user accounts (for example, accounts of b and c) connected to a same hotspot as the first user equipment. In some embodiments, the social server stores a correspondence between the received MAC address information of the one or more hotspots and the first user equipment identification information in a database for later query and matching by the social server. The hotspot server may further determine, according to the MAC address information of one or more hotspots, MAC address information of a second user equipment that is connected to the same hotspot as the first user equipment, and then send the second equipment MAC address information to the social server as connection record information. After receiving the information, the social server directly determines corresponding second user account information according to the second equipment MAC address information. Subsequently, the social server may perform marketing activities based on the second user account information or recommend the second user account to the first user.

In some embodiments, the connection record information may be equipment identification information that corresponds to the second user account and that is returned based on the first equipment identification information, or may be access point identification information of a wireless access point visited by the first equipment identification information. For example, the connection record information includes, but is not limited to: one or more pieces of equipment identification information, where a user equipment corresponding to each piece of equipment identification information and the first user equipment have visited at least one same wireless access point; one or more pieces of equipment identification information and identification information of the same wireless access point visited by the user equipment corresponding to each piece of equipment identification information and the first user equipment; one or more pieces of equipment identification information, where a user equipment corresponding to each of the one or more pieces of equipment identification information and the first user equipment being visiting a same wireless access point; and one or more pieces of access point identification information, where the first user equipment having visited a wireless access point corresponding to each of the one or more pieces of access point identification information.

For example, the social server sends the first equipment MAC address information to the hotspot server, and receives the connection record information returned by the hotspot server. The connection record information herein includes the second equipment MAC address information, that is, one or more pieces of equipment identification information determined by the hotspot server based on the first equipment MAC address information sent by the first network device. The hotspot server determines, according to the first equipment MAC address information, hotspots visited by the first user equipment, and then determines, according to these hotspots, the second equipment MAC address information corresponding to the second user equipment that has visited at least one same hotspot. More preferably, the connection record information may further be the second equipment MAC address information corresponding to a second user equipment of the same hotspot that is being visited by the first user equipment. For another example, the connection record information includes one or more pieces of equipment identification information, and the same wireless access point identification information that is visited by the user equipment corresponding to each piece of equipment identification information as the first user equipment, and the social server determines the second equipment MAC address information according to the connection record information. The process is similar to the foregoing, and details are not described again. For another example, the connection record information includes MAC address information of one or more hotspots, that is, the hotspot server queries, in a database based on the first equipment MAC address information sent by the social server, the obtained MAC address information of the hotspot visited by the first user equipment. The social server then determines a second user account connected to the same hotspot based on the hotspot MAC address information. The social server stores a correspondence between the received MAC address information of one or more hotspots and the user equipment identification information in the database for later use by the social server for query matching.

In some embodiments, the connection record information is second equipment identification information that is returned based on the first equipment identification information and that corresponds to a second user equipment that has visited at least one same wireless access point as the first user equipment. For example, the connection record information includes one or more pieces of equipment identification information, where a user equipment corresponding to each of the one or more pieces of equipment identification information and the first user equipment have visited at least one same wireless access point. In step S13, the first network device determines, based on the one or more pieces of equipment identification information and a mapping relationship between an equipment and an account, one or more second user accounts corresponding to the first user account, where each of the one or more second user accounts corresponds to one of the one or more pieces of equipment identification information.

For example, the social server sends the first equipment MAC address information to the hotspot server, and the hotspot server queries, in the database based on the first equipment MAC address information, the MAC address information of the hotspot connected to the first user equipment corresponding to the first equipment MAC address information. The hotspot server stores a connection login log of each user equipment, that is, a correspondence between the MAC address information of the hotspot visited by each user equipment and the equipment MAC address information. Then, the hotspot server performs matching according to the queried hotspot MAC address information, and determines the second equipment MAC address information corresponding to the second user equipment that has visited at least one piece of hotspot MAC address information. For example, if there is a correspondence between equipment MAC address information and one or several pieces of the queried hotspot MAC address information, it is determined that the equipment MAC address information is the second equipment MAC address information. Subsequently, the hotspot server sends one or more pieces of second equipment MAC address information to the social server, and after receiving the information, the social server determines, according to a binding relationship between the equipment MAC address information and the user account, the second user account corresponding to the second equipment MAC address information.

In some other embodiments, the connection record information is second equipment identification information that is returned based on the first equipment identification information and that corresponds to a second user equipment that is visiting the same wireless access point as the first user equipment. For example, the connection record information includes one or more pieces of equipment identification information, where a user equipment corresponding to each of the one or more pieces of equipment identification information and the first user equipment are visiting the same wireless access point. In step S13, the first network device determines, based on the one or more pieces of equipment identification information and a mapping relationship between an equipment and an account, one or more second user accounts corresponding to the first user account, where each of the one or more second user accounts corresponds to one of the one or more pieces of equipment identification information.

For example, the first user equipment is visiting a network through a hotspot, and the social server sends the equipment MAC address information of the user equipment to the hotspot server. The hotspot server receives the equipment MAC address information and queries the MAC address information of the hotspot being visited, then determines, based on the hotspot MAC address information, other user equipments that are visiting the hotspot, and uses the equipment MAC address information of these user equipments as the second equipment MAC address information. Subsequently, the hotspot server sends one or more pieces of second equipment MAC address information to the social server, and determines a corresponding second user account on the social server.

In still other embodiments, the connection record information is the corresponding access point identification information of the wireless access point visited by the first equipment identification information. The first network device receives the access point identification information, and establishes a correspondence between the first user account and the access point identification information based on a correspondence between the first equipment identification information and the first user account, and then the first network device performs matching and determines the corresponding second user account according to the correspondence between the user account and the access point identification information. For example, the connection record information includes one or more pieces of access point identification information, where the first user equipment has visited a wireless access point corresponding to each of the one or more pieces of access point identification information. In step S13, the first network device determines, based on the one or more pieces of access point identification information, one or more second user accounts corresponding to the first user account, where an access point identification information set corresponding to each of the one or more second user accounts includes at least one of the one or more pieces of access point identification information, and covers a wireless access point visited by the second user equipment corresponding to the second user account.

For example, the social server sends the first equipment MAC address information to the hotspot server, and the hotspot server receives the first equipment MAC address information and queries the corresponding hotspot MAC address information based on the MAC address information, that is, queries the connection login log sent to the hotspot server by the first user equipment corresponding to the first equipment MAC address information. The connection login log stores the hotspot MAC address information corresponding to the hotspot visited by the first user equipment. The hotspot server sends the queried MAC address information of one or more hotspots to the social server. The social server receives the hotspot MAC address information, and queries the matching in the database according to the correspondence between the user account and the hotspot MAC address information. If there is at least one of the one or more pieces of hotspot MAC address information in a user account, then the user account is a second user account.

In some embodiments, the first network device receives one or more pieces of access point identification information, and establishes or updates a mapping relationship between the first user account and the access point identification information set corresponding to the first user account. For example, in step S10 (not shown), the first network device establishes or updates a mapping relationship between the first user account and the access point identification information set according to the one or more pieces of access point identification information.

For example, the social server receives one or more pieces of hotspot MAC address information corresponding to the first equipment MAC address information sent by the hotspot server, and based on the relationship between the first equipment MAC address information and the first user account, establishes a correspondence between the first user account and the one or more pieces of hotspot MAC address information, that is, establishes a mapping relationship between the first user account and the hotspot MAC address information set. If the mapping relationship between the first user account and the hotspot MAC address information set already exists in the database, the MAC address information in the hotspot MAC address information set is updated on the basis.

In some embodiments, the connection record information is the corresponding access point identification information of the wireless access point visited by the first equipment identification information. The first network device determines the corresponding second equipment identification information based on the correspondence between the access point identification information and the equipment identification after receiving the access point identification information, and then determines the second user account corresponding to the second equipment identification information. For example, the connection record information includes one or more pieces of access point identification information, where the first user equipment has visited a wireless access point corresponding to each of the one or more pieces of access point identification information. In step S13, the first network device determines, based on the one or more pieces of access point identification information, one or more corresponding second user equipments, where there is at least one same visited wireless access point between each of the one or more second user equipments and the first user equipment. The first network device determines, based on the one or more second user equipments and a mapping relationship between an equipment and an account, one or more second user accounts corresponding to the first user account, where each of the one or more second user accounts corresponds to one of the one or more second user equipments.

For example, the social server sends the first equipment MAC address information to the hotspot server, and the hotspot server receives the first equipment MAC address information, determines the corresponding one or more pieces of hotspot MAC address information based on the equipment MAC address information, and then sends one or more pieces of hotspot MAC address information to the social server. The social server receives the hotspot MAC address information, and determines, based on the mapping relationship between the equipment MAC address information and the hotspot MAC address information, the second equipment MAC address information corresponding to the one or more pieces of hotspot MAC address information, that is, there is a mapping relationship between the second equipment MAC address information and at least one of the one or more pieces of hotspot MAC address information. Subsequently, the social server determines, according to the second equipment MAC address information, the second user account bound in the application.

In some embodiments, after determining the second user account, the first network device will recommend the second user account to the first user. For example, in step S14 (not shown), the first network device sends at least one of the one or more second user accounts to the first user equipment. Further, in another some embodiments, the first network device determines a preferred second user account, and recommends the preferred second user account to the first user. For example, the first user equipment determines a preferred second user account from the one or more second user accounts. In step S14, the first network device sends the preferred second user account to the first user equipment.

For example, after the social server and the hotspot server cooperate to determine the second user account corresponding to the first user account based on the same hotspot, the social server recommends at least one of the matched second user accounts to the first user account, which helps the first user expand the social circle. More preferably, during the process of recommending the second user account, the social server may first perform preferred processing on the matched second user account, which helps improve the quality of the recommended user account and can improve use experience of the user.

In some embodiments, the first network device determines the preferred second user account according to the second user account. The process may be performing preferred processing through a threshold of the number of the same visited hotspots, or may be performing preferred processing by determining whether the maximum frequency of the same visited hotspots satisfies the frequency threshold. For example, the determining a preferred second user account includes at least any of the following: if the number of the same visited wireless access points between the second user equipment corresponding to the second user account and the first user equipment satisfies a first number threshold, determining, by the first network device, the second user account as the preferred second user account; and if a maximum connection frequency of the same visited wireless access points between the second user equipment corresponding to the second user account and the first user equipment satisfies a first frequency threshold, determining, by the first network device, the second user account as the preferred second user account.

For example, the connection record information includes corresponding second user equipment identification information and the same hotspot MAC information visited by the first user equipment, and the social server receives, stores or updates each piece of second user equipment identification information or hotspot MAC address information corresponding to each second user account. Alternatively, the connection record information includes hotspot MAC address information visited by corresponding first user equipment MAC address information, and the social server receives, stores or updates the first user equipment MAC address information or hotspot MAC address information corresponding to the first user account. Before recommending the second user account to the first user account, the social server first performs preferred processing on the determined second user account according to a correspondence that is between MAC information of each second user equipment or the second user account and the hotspot MAC address information and that is stored in the social server, and recommends the preferred second user account to the first user. For example, if the number of same visited hotspots between the second user equipment corresponding to the second user account and the first user equipment satisfies the first number threshold, the second user account is determined as is a preferred second user account, that is, an amount of same hotspot MAC address information in the hotspot MAC address information set corresponding to the second user account and the hotspot MAC address information set corresponding to the first user account satisfies the first number threshold. For another example, if a maximum connection frequency of the same visited wireless access points between the second user equipment corresponding to the second user account and the first user equipment satisfies a first frequency threshold, the second user account is determined as the preferred second user account, that is, a connection frequency of one piece of hotspot MAC address information with the highest connection frequency in the same hotspot MAC address information in the hotspot MAC address information set corresponding to the second user account and the hotspot MAC address information set corresponding to the first user account exceeds the first frequency threshold. The social server sends the preferred second user account to the first user equipment, that is, recommends the preferred second user account to the first user account, which ensures the quality of the recommended user account while expanding the social circle of the first user.

In some embodiments, when recommending the second user account to the first user, the first network device may further send recommendation information about the second user account to the first user. For example, in step S14, the first network device sends at least one of the one or more second user accounts and recommendation information corresponding to the at least one of the one or more second user account to the first user equipment. Further, in some embodiments, the recommendation information about the second user account may include same wireless access points or at least one of the same wireless access points visited by the second user account and the first user account, may further include a number of the same visited wireless access points, and may further include the same visited wireless access point that satisfies the second frequency threshold or one of the same visited wireless access points with the most connection times. For example, the recommendation information includes at least any of the following: access point identification information of the same visited wireless access points between the second user equipment corresponding to the second user account and the first user equipment; at least one piece of access point identification information of the same visited wireless access points between the second user equipment corresponding to the second user account and the first user equipment; the number of the same visited wireless access points between the second user equipment corresponding to the second user account and the first user equipment; access point identification information of a wireless access point whose connection frequency satisfies a second frequency threshold in the same visited wireless access points between the second user equipment corresponding to the second user account and the first user equipment; and access point identification information of a wireless access point with a maximum connection frequency in the same visited wireless access points between the second user equipment corresponding to the second user account and the first user equipment.

For example, the connection record information includes corresponding second user equipment identification information and the same hotspot MAC information visited by the first user equipment, and the social server receives, stores or updates each piece of second user equipment identification information or hotspot MAC address information corresponding to each second user account. Alternatively, the connection record information includes hotspot MAC address information visited by corresponding first user equipment MAC address information, and the social server receives, stores or updates the first user equipment MAC address information or hotspot MAC address information corresponding to the first user account. While recommending the second user account to the first user account, the social server may send recommendation information about the second user account to the first user equipment according to a matching or preference result, present the recommendation information to the first user, and assist the first user in determining whether to add the second user account as a friend. More preferably, the recommendation information may be hotspot MAC address information of the same visited hotspot between the second user equipment corresponding to the second user account and the first user equipment, that is, a hotspot corresponding to the same hotspot MAC address information in a hotspot MAC address information set respectively corresponding to the first equipment MAC address information and the second equipment MAC address information. The recommendation information may further be at least one piece of hotspot MAC address information of the same visited hotspot between the second user equipment corresponding to the second user account and the first user equipment, that is, at least one corresponding hotspot in the same hotspot MAC address information in a hotspot MAC address information set respectively corresponding to the first equipment MAC address information and the second equipment MAC address information, and the recommendation information is kept concise when the user is assisted. For another example, the recommendation information may further be the number of the same visited hotspot between the second user equipment corresponding to the second user account and the first user equipment, that is, an amount of the same hotspot MAC address information in a hotspot MAC address information set respectively corresponding to the first equipment MAC address information and the second equipment MAC address information. For another example, the recommendation information may further be a hotspot whose connection frequency satisfies a second frequency threshold in the same visited wireless access hotspot between the second user equipment corresponding to the second user account and the first user equipment, that is, a hotspot corresponding to the hotspot MAC address information that a connection frequency of the second user equipment satisfies the second frequency threshold in the same hotspot MAC address information in a hotspot MAC address information set respectively corresponding to the first equipment MAC address information and the second equipment MAC address information. For another example, the recommendation information may further be a hotspot with the highest connection frequency in the same visited hotspots between the second user equipment corresponding to the second user account and the first user equipment, that is, a hotspot corresponding to the hotspot MAC address information with the highest connection frequency of the second user equipment in the same hotspot MAC address information in the hotspot MAC address information set respectively corresponding to the first equipment MAC address information and the second equipment MAC address information.

In some embodiments, when recommending the second user account to the first user, the first network device first removes the second user account included in a friend list of the first user account. For example, in step S14, the first network device sends at least one of the one or more second user accounts to the first user equipment, where the second user accounts that are sent are not included in the friend list of the first user account.

For example, when recommending the second user account to the first user account, the social server preprocesses the second user account determined by visiting the same hotspot, that is, deletes the second user account existing in the friend list of the first user account, to prevent repeated recommendation. The social server matches the account in the friend list in the first user account information according to relevant information of the second user account, and if the account in the friend list of the first user account is the same as the second user account, the second user account is deleted. If the account in the friend list of the first user account is not the same as the second user account, the social server recommends the second user account to the first user account.

In some embodiments, the first network device not only recommends the second user account to the first user, but also recommends the first user account to the second user. For example, in step S15 (not shown), the first network device sends the first user account to at least one of the one or more second user equipments.

For example, while recommending the second user account to the first user account, the social server may further recommend the first user account to the second user account, which can implement interaction between the two more effectively and greatly improve use experience of the user. More preferably, while recommending the first user account to the second user account, the social server may further include some relevant information of the first user account as recommendation information to assist the second user in determining whether to add the first user account as a friend, for example, same hotspots in a set of hotspots respectively visited by the user equipment corresponding to the first user account and the second user account, a hotspot with a higher connection frequency in the same hotspots, or the like.

Figure 3:
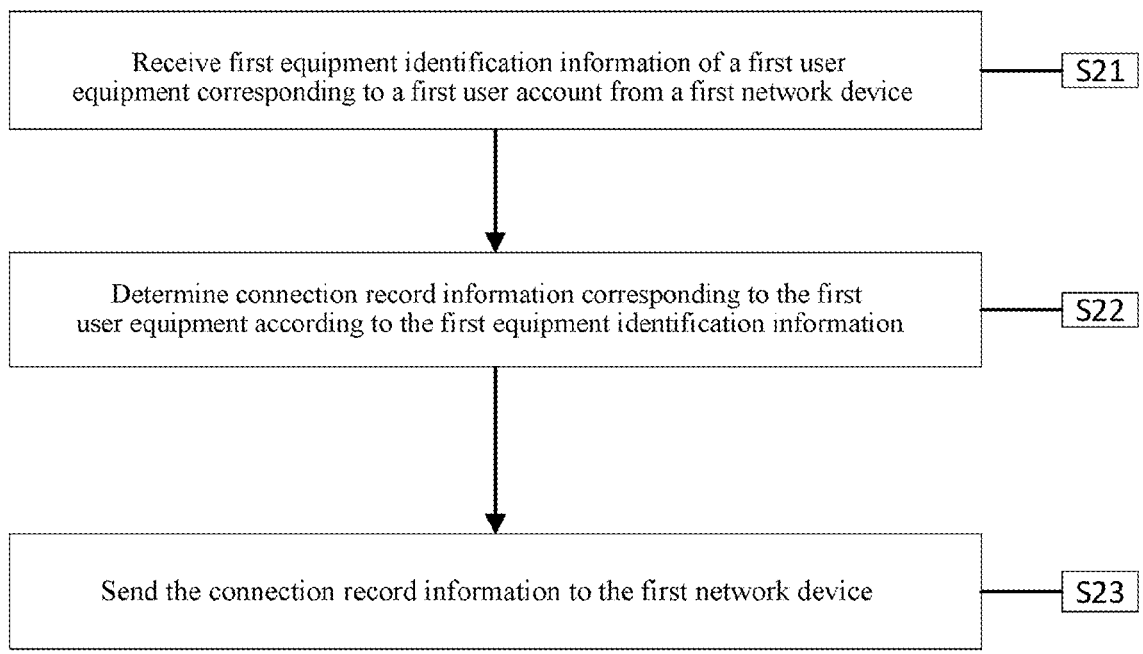
FIG. 3 is a flowchart of a method for managing a user at a second network device side according to another embodiment of the present application.

FIG. 3 shows a method for managing a user at a second network device side according to some embodiments of the present application. The method includes step S21, step S22, and step S23. In step S21, a second network device receives first equipment identification information of a first user equipment corresponding to a first user account from a first network device. In step S22, the second network device determines, according to the first equipment identification information, connection record information corresponding to the first user equipment. In step S23, the second network device sends the connection record information to the first network device.

For example, a first user holds a first user equipment (such as a mobile phone), the first user equipment is installed with an application corresponding to the social server, and the first user has a corresponding first user account in the application. The social server sends, to a hotspot server, the MAC address information corresponding to the first user equipment, and the hotspot server queries, according to the first equipment identification information, an access log corresponding to the first equipment identification information, to obtain MAC address information of one or more hotspots connected to the first user equipment. The hotspot server may send the MAC address information of the one or more hotspots to the social server as connection record information, and the social server receives the MAC address information of the one or more hotspots, and matches and determines second user accounts (for example, accounts of b and c) connected to a same hotspot as the first user equipment.

The hotspot server may further determine, according to the MAC address information of one or more hotspots, MAC address information of a second user equipment that is connected to the same hotspot as the first user equipment, and then send the second equipment MAC address information to the social server as connection record information. After receiving the information, the social server directly determines corresponding second user account information according to the second equipment MAC address information. Subsequently, the social server may perform marketing activities based on the second user account information or recommend the second user account to the first user.

In some embodiments, the connection record information is one or more pieces of access point identification information corresponding to the first equipment identification information. The second network device determines, according to the first equipment identification information, access point identification information of the wireless access point visited by the first user equipment, and sends the access point identification information to the first network device. For example, in step S22, the second network device determines, according to the first equipment identification information, connection record information corresponding to the first user equipment. The connection record information includes one or more pieces of access point identification information, and the first user equipment has visited a wireless access point corresponding to each of the one or more pieces of access point identification information.

For example, the social server sends the first equipment MAC address information to the hotspot server, and the hotspot server receives the first equipment MAC address information and queries the corresponding hotspot MAC address information based on the MAC address information, that is, queries a connection login log sent by the first user equipment corresponding to the first equipment MAC address information to the hotspot server. The connection login log stores hotspot MAC address information corresponding to the hotspot visited by the first user equipment. The hotspot server sends the queried MAC address information of one or more hotspots to the social server. The social server receives the hotspot MAC address information, and queries the matching in the database according to the correspondence between the user account and the hotspot MAC address information. If there is at least one of the one or more pieces of hotspot MAC address information in a user account, then the user account is a second user account.

In some other embodiments, the connection record information is second equipment identification information that the second network device determines the same visited wireless access point by performing matching according to the access point identification information corresponding to the first equipment identification information. For example, in step S22, the second network device determines, according to the first equipment identification information, one or more pieces of access point identification information corresponding to the first user equipment, and the first user equipment has visited a wireless access point corresponding to each of the one or more pieces of access point identification information. The second network device determines, based on the one or more pieces of access point identification information, the connection record information corresponding to the first user equipment. The connection record information includes one or more pieces of equipment identification information, and a user equipment corresponding to each piece of equipment identification information has visited at least one wireless access point corresponding to at least one of the one or more pieces of the access point identification information.

For example, the social server sends the first equipment MAC address information to the hotspot server, and the hotspot server queries, in the database based on the first equipment MAC address information, the MAC address information of the hotspot connected to the first user equipment corresponding to the first equipment MAC address information. The hotspot server stores a connection login log of each user equipment, that is, a correspondence between the MAC address information of the hotspot visited by each user equipment and the equipment MAC address information. Then, the hotspot server performs matching according to the queried hotspot MAC address information, and determines the second equipment MAC address information corresponding to the second user equipment that has visited at least one piece of hotspot MAC address information. For example, if there is a correspondence between equipment MAC address information and one or several pieces of the queried hotspot MAC address information, it is determined that the equipment MAC address information is the second equipment MAC address information. Subsequently, the hotspot server sends one or more pieces of second equipment MAC address information to the social server, and after receiving the information, the social server determines, according to a binding relationship between the equipment MAC address information and the user account, the second user account corresponding to the second equipment MAC address information.

In some other embodiments, the connection record information is second equipment identification information that the second network device determines, by performing matching according to access point identification information of a wireless access point being connected to the first equipment identification information, the same wireless access point that is being visited. For example, in step S22, the second network device determines the wireless access point being currently visited by the first user equipment according to the first equipment identification information, and determines the connection record information corresponding to the first user equipment. The connection record information includes one or more pieces of equipment identification information, and a user equipment corresponding to each of the one or more pieces of equipment identification information is visiting the wireless access point.

For example, the first user equipment is visiting a network through a hotspot, and the social server sends equipment MAC address information of the user equipment to the hotspot server. The hotspot server receives the equipment MAC address information and queries the MAC address information of the hotspot being visited, then determines, based on the hotspot MAC address information, equipment MAC address information of other user equipments that are visiting the hotspot, and uses the equipment MAC address information of these user equipments as the second equipment MAC address information. Subsequently, the hotspot server sends one or more pieces of second equipment MAC address information to the social server, and determines a corresponding second user account on the social server.

Figure 4:
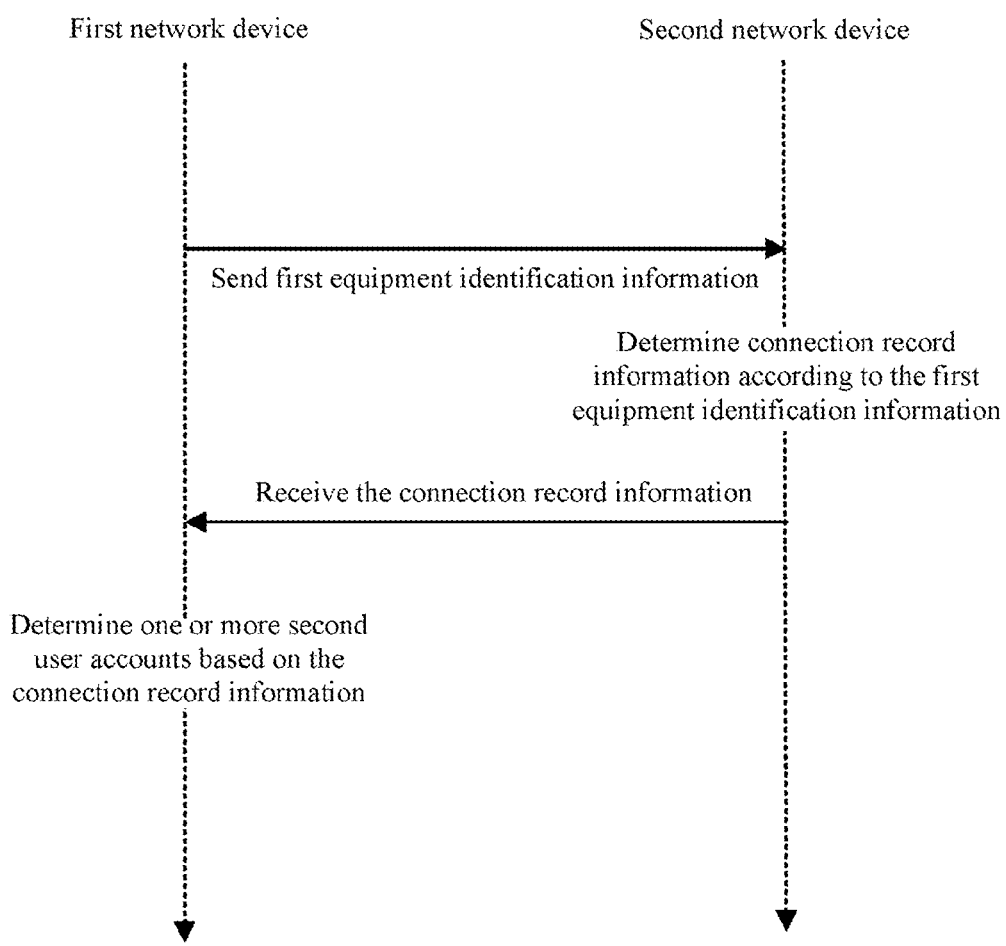
FIG. 4 shows a system method for managing a user according to an embodiment of the present application.

FIG. 4 shows a system method for managing a user according to some embodiments of the present application. The method includes:

sending, by a first network device, first equipment identification information of a first user equipment corresponding to a first user account to a second network device;

receiving, by the second network device, the first equipment identification information, determining, according to the first equipment identification information, connection record information corresponding to the first user equipment, and sending the connection record information to the first network device; and receiving, by the first network device, the connection record information, and determining, based on the connection record information, one or more second user accounts corresponding to the first user account, where there is at least one same visited wireless access point between a second user equipment corresponding to each of the one or more second user accounts and the first user equipment.

The present application further provides a computer-readable storage medium. The computer-readable storage medium stores a computer program code, and when the computer program code is executed, any one of the foregoing method is implemented.

The present application further provides a computer program product, when the computer program product is executed by the computer device, any one of the foregoing method is implemented.

The present application further provides a computer device, the computer device including:

one or more processors; and a memory, configured to store one or more computer programs; and when the one or more computer programs are executed by the one or more processors, the one or more processors are enabled to implement any one of the foregoing method.

It should be noted that the present application may be implemented in software and/or a combination of software and hardware, for example, may be implemented by using an application-specific integrated circuit (ASIC), a general-purpose computer, or another similar hardware device. In an embodiment, the software program in the present application may be executed by a processor to implement the steps or functions described above. Similarly, the software program (including related data structures) in the present application may be stored in a computer-readable recording medium such as a RAM memory, a magnetic or optical drive or a floppy disk, and the like. In addition, some of the steps or functions of the present application may be implemented in hardware, for example, a circuit that cooperates with a processor to perform the steps or functions.

In addition, a part of the present application may be applied to a computer program product, such as a computer program instruction. The computer program instruction, when executed by a computer, may invoke or provide a method and/or technical solution according to the present application by operations of the computer. A person skilled in the art should understand that a form of the computer program instruction in the computer-readable medium includes, but is not limited to, a source file, an executable file, an installation package file, and the like. Accordingly, a manner in which the computer program instruction is executed by the computer includes, but is not limited to: the computer directly executes the instruction, or the computer compiles the instruction and then executes the corresponding compiled program, or the computer reads and executes the instruction, or the computer reads and installs the instruction and then executes the corresponding installed program. In this case, the computer-readable medium may be any available computer readable-storage medium or communication medium that can be accessed by the computer.

Communication media include media that can be transferred from one system to another system by communication signals including, for example, computer-readable instructions, data structures, program modules, or other data. Communication media may include conductive transmission media (such as cables and wires (for example, fiber optics, coaxial, and the like)) and wireless (transmission without conduction) media capable of propagating energy waves such as acoustic, electromagnetic, RF, microwave, and infrared. Computer readable instructions, data structures, program modules, or other data may be embodied, for example, as modulated data signals in a wireless medium (such as a carrier wave or a similar mechanism embodied as a part of the spread spectrum technology). The term "modulated data signal" refers to a signal whose one or more features are altered or set in such a manner as to encode information in the signal. Modulation may be analog, digital or hybrid modulation techniques.

As an example instead of limitation, the computer-readable storage medium includes volatile and non-volatile media, and removable and non-removable media implemented by using any method or technology for storing information such as computer-readable instructions, data structures, program modules, or other data. For example, the computer-readable storage medium includes, but is not limited to, volatile memories such as random access memories (RAM, DRAM, SRAM); and nonvolatile memories such as a flash memory, various read only memories (ROM, PROM, EPROM, EEPROM), magnetic and ferromagnetic/ferroelectric memories (MRAM, FeRAM); and magnetic and optical storage devices (hard disk, magnetic tape, CD, DVD); or other currently known media or media developed in the future and capable of storing computer-readable information/data used by computer systems.

Herein, an embodiment according to the present application includes an apparatus. The apparatus includes a memory configured to store a computer program instruction and a processor configured to execute the program instruction. When the computer program instruction is executed by the processor, the apparatus is triggered to run the method and/or the technical solution according to the embodiments of the present application.

It is apparent to a person skilled in the art that the present application is not limited to details in the foregoing exemplary embodiments, and the present application can be implemented in another specific form without departing from the spirit or basic features of the present application. Therefore, the embodiments should be considered to be exemplary in all respects and not limitative. The scope of the present application is not defined by the foregoing description but by the appended claims. The present application is intended to include all the variations that are equivalent in significance and scope to the claims. No reference numerals in the claims should be considered as limitations to the related claims. In addition, the term "include" apparently does not exclude other units or steps, and a singular form does not exclude a plural form. Multiple units or apparatuses recited in an apparatus claim may also be implemented by one unit or apparatus through software or hardware. Terms such as "first" and "second" are used to indicate names, but do not indicate any particular sequence.

What is claimed is:

1. A method for managing a user at a first network device side, comprising:
    sending first equipment identification information of a first user equipment corresponding to a first user account to a second network device;
    receiving connection record information corresponding to the first user equipment, wherein the connection record information corresponding to the first user equipment is returned by the second network device;
    determining, based on the connection record information, one or more second user accounts corresponding to the first user account, wherein a second user equipment and the first user equipment have visited at least one same wireless access point, and the second user equipment corresponds to each second user account of the one or more second user accounts; and
    sending at least one of the one or more second user accounts to the first user equipment.

2. The method according to claim 1, wherein, the connection record information comprises at least one piece selected from the group consisting of:
    one or more pieces of equipment identification information, wherein a user equipment corresponding to each piece of the one or more pieces of the equipment identification information and the first user equipment have visited the at least one same wireless access point;
    one or more pieces of the equipment identification information and identification information of the at least one same wireless access point
    one or more pieces of second equipment identification information, wherein the user equipment corresponding to each piece of the one or more pieces of the second equipment identification information and the first user equipment are visiting the at least one same wireless access point; and
    one or more pieces of access point identification information, wherein the first user equipment has visited the at least one same wireless access point corresponding to each piece of the one or more pieces of the access point identification information.

3. The method according to claim 2, wherein, the connection record information comprises the one or more pieces of the equipment identification information, wherein the user equipment corresponding to the each piece of the equipment identification information and the first user equipment have visited the at least one same wireless access point; and
    the step of determining, based on the connection record information, the one or more second user accounts corresponding to the first user account, wherein the second user equipment and the first user equipment have visited the at least one same wireless access point, and the second user equipment corresponds to the each second user account comprises:
    determining, based on the one or more pieces of the equipment identification information and a mapping relationship between the second user equipment and the one or more second user accounts, the one or more second user accounts corresponding to the first user account, wherein the each second user account corresponds to one piece of the one or more pieces of the equipment identification information.

4. The method according to claim 2, wherein, the connection record information comprises the one or more pieces of the second equipment identification information, the user equipment corresponding to the each piece of the equipment identification information and the first user equipment are visiting the at least one same wireless access point; and
    the step of determining, based on the connection record information, the one or more second user accounts corresponding to the first user account, wherein the second user equipment and the first user equipment have visited the at least one same wireless access point, and the second user equipment corresponds to the each second user account comprises:
    determining, based on the one or more pieces of the second equipment identification information and a mapping relationship between the second user equipment and the one or more second user accounts, the one or more second user accounts corresponding to the first user account, wherein the each second user account corresponds to one piece of the one or more pieces of the equipment identification information.

5. The method according to claim 2, wherein, the connection record information comprises the one or more pieces of the access point identification information, the first user equipment has visited the at least one same wireless access point corresponding to the each piece of the access point identification information; and
    the step of determining, based on the connection record information, the one or more second user accounts corresponding to the first user account, wherein the second user equipment and the first user equipment have visited the at least one same wireless access point, and the second user equipment corresponds to the each second user account comprises:
    determining, based on the one or more pieces of the access point identification information, the one or more second user accounts corresponding to the first user account, wherein an access point identification information set corresponding to the each second user account comprises at least one of the one or more pieces of the access point identification information, and covers the at least one same wireless access point visited by the second user equipment corresponding to the one or more second user accounts.

6. The method according to claim 5, further comprising:
    establishing a mapping relationship between the first user account and the access point identification information set according to the one or more pieces of the access point identification information; or
    updating a mapping relationship between the first user account and the access point identification information set according to the one or more pieces of the access point identification information.

7. The method according to claim 2, wherein, the connection record information comprises the one or more pieces of the access point identification information, the first user equipment has visited the at least one same wireless access point corresponding to the each piece of the access point identification information; and
    the step of determining, based on the connection record information, the one or more second user accounts corresponding to the first user account, wherein the second user equipment and the first user equipment have visited the at least one same wireless access point, and the second user equipment corresponds to the each second user account comprises:
    determining, based on the one or more pieces of the access point identification information, the second user equipment corresponding to the one or more pieces of the access point identification information, wherein the second user equipment and the first user equipment have visited the at least one same wireless access point; and determining, based on the second user equipment and a mapping relationship between the second user equipment and the one or more second user accounts, the one or more second user accounts corresponding to the first user account, wherein the each second user account corresponds to the second user equipment.

8. The method according to claim 1, further comprising:
determining a predetermined second user account from the one or more second user accounts, wherein the step of sending the at least one of the one or more second user accounts to the first user equipment comprises:

sending the predetermined second user account to the first user equipment.

9. The method according to claim 8, wherein, the step of determining the predetermined second user account comprises:
   if the number of the at least one same wireless access point visited by the second user equipment and the first user equipment satisfies a first number threshold, determining the one or more second user accounts as the predetermined second user account; and
   if a maximum connection frequency of the at least one same wireless access point visited by the second user equipment and the first user equipment satisfies a first frequency threshold, determining the one or more second user accounts as the predetermined second user account.

10. The method according to claim 1, wherein, the step of sending the at least one of the one or more second user accounts to the first user equipment comprises:

sending the at least one of the one or more second user accounts and recommendation information corresponding to the one or more second user accounts to the first user equipment.

11. The method according to claim 10, wherein, the recommendation information comprises at least one selected from the group consisting of:
   first access point identification information of the at least one same wireless access point visited by the second user equipment and the first user equipment;
   at least one piece of the first access point identification information of the at least one same wireless access point visited by the second user equipment and the first user equipment;
   the number of the at least one same wireless access point visited by the second user equipment and the first user equipment;
   second access point identification information of a wireless access point having a connection frequency satisfying a second frequency threshold in the at least one same wireless access point visited by the second user equipment and the first user equipment; and
   third access point identification information of a wireless access point having a maximum connection frequency in the at least one same wireless access point visited by the second user equipment and the first user equipment.

12. The method according to claim 1, wherein, the at least one of the one or more second user accounts is not comprised in a friend list of the first user account.

13. The method according to claim 1, further comprising:
   sending the first user account to the second user equipment.

* * * * *